Figure 1:
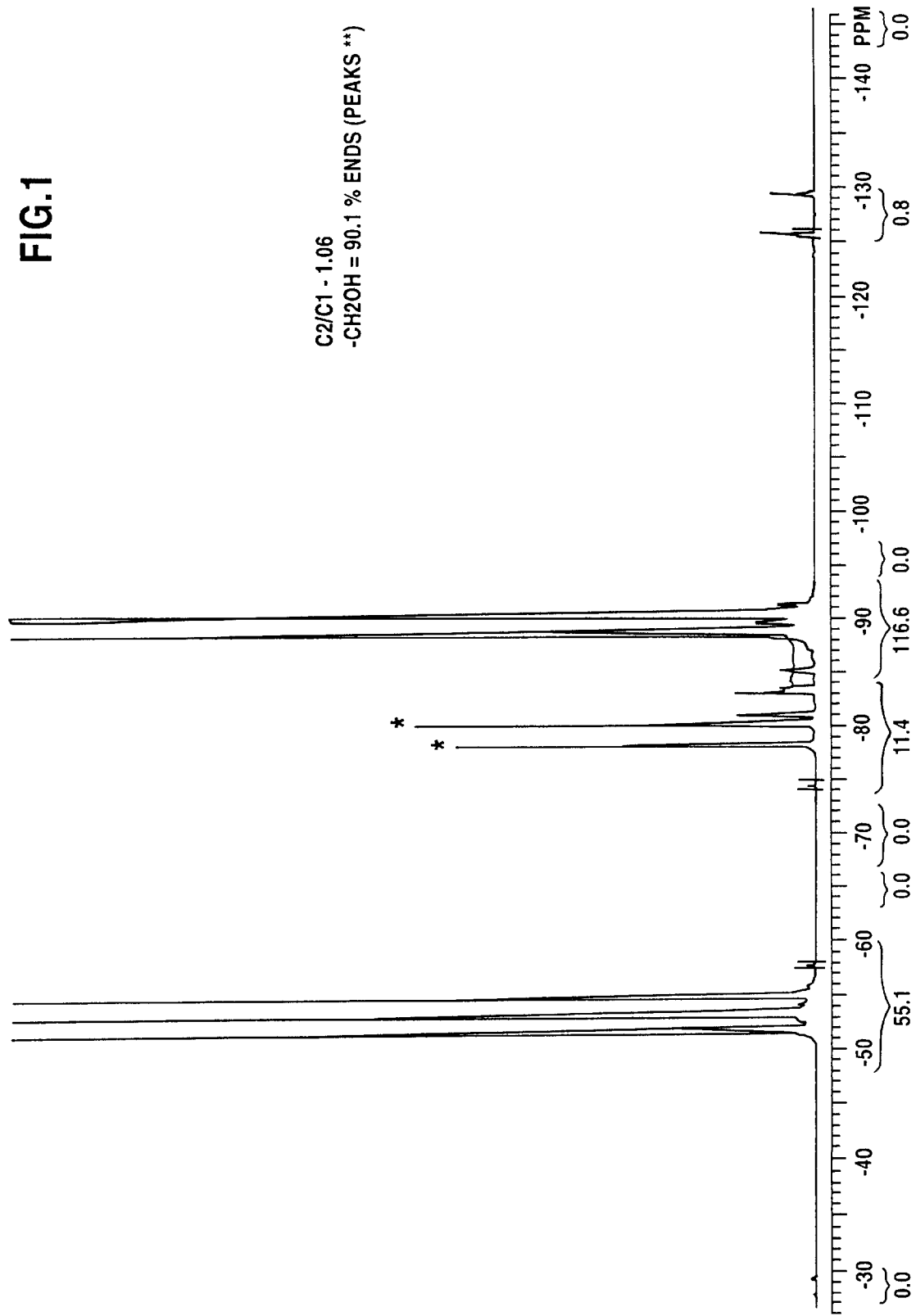

United States Patent
Turri et al.

Patent Number: 5,900,500
Date of Patent: May 4, 1999

[54] PERFLUOROPOLYETHERS HAVING POLYCARBONATE STRUCTURE

[75] Inventors: Stefano Turri, Brugherio; Marinella Levi, Milan; Claudio Tonelli, Concorezzo; Ferdinando Danusso, Milan, all of Italy

[73] Assignee: Ausimont S.p.A., Milan, Italy

[21] Appl. No.: 08/903,061

[22] Filed: Jul. 30, 1997

[30] Foreign Application Priority Data

Aug. 2, 1996 [IT] Italy .................. MI96Z1673

[51] Int. Cl.⁶ .................. C07C 69/96
[52] U.S. Cl. .................. 558/266
[58] Field of Search .................. 558/266

[56] References Cited

U.S. PATENT DOCUMENTS

| | | | |
|---|---|---|---|
| 2,242,218 | 5/1941 | Auer .................. | 91/70 |
| 3,665,041 | 5/1972 | Sianesi et al. .................. | 260/615 |
| 3,715,378 | 2/1973 | Sianesi et al. .................. | 260/463 |
| 3,766,251 | 10/1973 | Caporiccio et al. .................. | 260/456 |
| 3,810,254 | 5/1974 | Utsumi et al. .................. | 324/5 R |
| 3,810,874 | 5/1974 | Mitsch et al. .................. | 260/75 |
| 4,085,137 | 4/1978 | Mitsch et al. .................. | 260/561 |
| 4,772,526 | 9/1988 | Kan et al. . | |
| 5,476,918 | 12/1995 | Danusso et al. .................. | 528/244 |

FOREIGN PATENT DOCUMENTS

| | | |
|---|---|---|
| 148482 | 7/1985 | European Pat. Off. . |
| 239123 | 9/1987 | European Pat. Off. . |
| 0 335 416 | 10/1989 | European Pat. Off. . |
| 5101145 | 8/1995 | European Pat. Off. . |

OTHER PUBLICATIONS

Macromolecules 28, p. 7271 (1995).

*Primary Examiner*—Johann Richter
*Assistant Examiner*—Joseph Murray
*Attorney, Agent, or Firm*—Nikaido Marmelstein Murray & Oram, LLP

[57] ABSTRACT

Perfluoropolyethereal compounds having polycarbonate structure, and general formula:

$$—[Rf—CH_2O(CH_2CH_2O)_cCOCH_2]_n— \quad (I)$$
$$\|$$
$$O$$

wherein c is an integer comprised between 0 and 10, preferably between 0 and 3, n is an integer from 2 to 1,000, extremes included, Rf is a poly-fluorooxyalkylenic chain, having number average molecular weight (Mn) comprised between 500 and 10,000.

16 Claims, 2 Drawing Sheets

PERFLUOROPOLYETHERS HAVING POLYCARBONATE STRUCTURE

The present invention relates to new compounds containing fluorine in the form both of oligomers and polymers having improved performances.

In particular the present invention relates to perfluoropolyethers having polycarbonate structure.

More in detail the present invention relates to the preparation of new polycarbonates optionally functionalized, as defined hereinunder, to be utilized for the preparation of films having high performances such as chemical resistance, durability, high definition of the image, high gloss, to be used as protective coatings of various substrates.

Another use is that of fluorinated macromeric modifiers of thermoprocessable or crosslinkable polymers having an elastomeric or plastomeric structure to improve the bulk or surface features, such as: chemical resistance, friction coefficient, surface energy and contact angles.

Compounds containing fluorine with a polycarbonate structure, in particular containing segments of perfluoropolyethereal type, are not described in the prior art.

Fluorinated compounds having a polyacetal structure, both oligomeric and polymeric, are known, which have a very low glass transition temperature (Tg), good resistance to chemical agents, which, depending on their molecular weight, can be used as macromers to prepare copolymers having a low Tg or as polymers as such having a low Tg. See for instance U.S. Pat. No. 5,476,918.

The perfluoropolyethers having a polyacetal structure show however the following drawbacks:

the process requires the use of concentrated sulphuric acid:

the preparation process requires particular attention and control of the parameters in the preparation phase of the formaldehyde monomer solution. In particular it is to be controlled the dissolution time of the paraformaldehyde in sulphuric acid in order to assure a complete solubility of the paraformaldehyde. If this control is not carefully carried out, molecular weights different from the desired ones, generally lower molecular weights, are obtained. This leads therefore to final inferior properties of the polymer obtained by utilization of these building blocks, for instance different hardness, elongation at break, generally tensile and elastic properties no longer controlled.

Besides it is not easy to obtain building blocks with low molecular weights, i.e. oligomers having number average molecular weight around 10,000, since products with a very wide distribution of the molecular weights are obtained, the polydispersity is in the range of 3–4 determined by GPC (Gel Permeation Chromatography), with consistent fractions of unreacted hydroxilic monomer (fluorinated diol) or cycled on itself.

A broad molecular weight distribution brings to films having worse mechanical properties. Therefore it is necessary to have available a fractionation process to obtain a narrower molecular weight distribution. This fractionation is difficult from an industrial point of view since it also requires large amounts of solvents. From the industrial point of view this implies the need of a further purification step by fractionation to remove the unreacted or cycled species. Moreover the preparation process of these products requires in the final steps of dissolution of the oligomer/polymer and of neutralization of the sulphuric acid the employment of perhalogenated solvents, such as chlorofluorocarbons (CFC), for instance R 113 or perfluoroalkanes, such as perfluoroheptane. These solvents are utilized in high amounts in the range of 80–90% by weight. This means to have processes having a strong environmental impact and reduced potentiality. Besides CFCs cannot any longer be used in view of the laws in force in various countries which reduce the utilization of chlorofluorocarbon compounds.

The employment of perfluorocarbon solvents leads to very expensive processes due to their high production cost;

perfluoropolyethers having polyacetal structure show moreover a thermal stability up to 200° C. in air. This hinders some applications in which a higher thermal resistance both as peak temperature and as maintenance of the properties for very long times of utilization is required.

Moreover the photooxidative stability of polyacetals having perfluoropolyethereal structure does not result very high especially for applications in which the maintenance of the aesthetic properties, such as gloss, image definition (DOI), discolouration (delta-E), and mechanical properties after long external exposition must be assured.

The Applicant has now unexpectedly found a new class of fluorinated compounds having perfluoropolyethereal structure allowing to overcome the drawbacks indicated above, by combining a semplified synthesis process, which does not require either the use of particular control procedures or the utilization of great amounts of solvent, preferably the process is generally carried out without the use of solvent. To this it is combined a better control of the molecular weights, in particular this allows the obtainment of oligomers having reduced polydispersity with respect to perfluoropolyethers having polyacetal structure, Mw/Mn<3, in particular also in the range of 2.

The Applicant has surprisingly found that with the perfluoropolyethers having polycarbonate structure also starting from stoichiometric ratios near the unit among the reactants, the chain terminals are essentially formed by hydroxylic groups of the fluorinated macromer as determined by IR and $^1$H NMR analysis. Such terminals can be usefully employed for successive functionalization and polymerization reactions.

The perfluoropolyethereal compounds having polycarbonate structure, which form an object of the present invention, are comprised in the general formula:

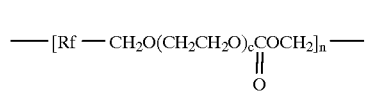

(I)

wherein c is an integer comprised between 0 and 10, preferably between 0 and 3, n is an integer from 2 to 1,000, extremes included, Rf is a poly-fluorooxyalkylenic chain, having number average molecular weight (Mn) comprised between 500 and 10,000, preferably between 1,000 and 4,000, comprising repeating units having at least one of the following structures, randomly distributed in the chain:

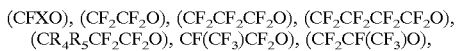

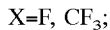

wherein

X=F, CF$_3$;

R$_4$ and R$_5$, equal to or different from each other, are selected from H, Cl, or perfluoroalkyl from 1 to 4 carbon atoms.

In particular Rf can have one of the following structures:

1) —(CF$_2$O)$_{a'}$—(CF$_2$CF$_2$O)$_{b'}$—
  with a'/b' comprised between 0.5 and 2, extremes included, a' and b' being integers such as to give the molecular weight indicated above;

2) —(C$_3$F$_6$O)$_r$—(C$_2$F$_4$O)$_b$—(CFXO)$_t$—
  r/b=0.5–2.0; (r+b)/t is comprised between 10–30, b, r and t being integers such as to give the molecular weight indicated above, X has the meaning indicated above;

3) —(C$_3$F$_6$O)$_{r'}$—(CFXO)$_{t'}$, —
  with r'/t'=10–30,
  r' and t' being integers such as to give the molecular weight indicated above; X has the above meaning;

4) —(OCF$_2$CF(CF$_3$))$_z$—OCF$_2$(R'f)$_y$—CF$_2$O— (CF(CF$_3$)CF$_2$O)$_z$—
  wherein z is an integer such that the molecular weight is that indicated above;
  y is an integer comprised betwen 0 and 1 and R'f is a fluoroalkylenic group for instance having 1–4 carbon atoms;

5) —(OCF$_2$CF$_2$CR$_4$R$_5$)$_q$—OCF$_2$(R'f)$_y$—CF$_2$O—(CR$_4$R$_5$CF$_2$CF$_2$O)$_s$—
  wherein
  q and s are integers such that the molecular weight is that indicated above;
  R$_4$, R$_5$, R'f, y have the meaning indicated above;

6) —(C$_3$F$_6$O)$_{r''}$(CFXO)$_{t''}$—OCF$_2$(R'f)$_y$—CF$_2$O(CF(CF$_3$)CF$_2$O)$_{r'''}$(CFXO)$_{t'''}$—
  where r'''/t'''=10–30,
  r''' and t''' being integers such as to give the molecular weight indicated above;
  R'f and y having the meaning indicated above.

In the formulae indicated above:

—(C$_3$F$_6$O)— can represent units of formula

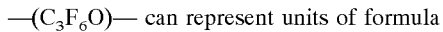

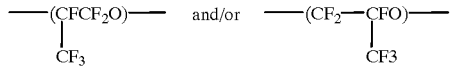

The mentioned fluoropolyethers are obtainable by the well known processes in the art, see for instance the following patents herein incorporated by reference: U.S. Pat. Nos. 3,665,041, 2,242,218, 3,715,378, and the European patent EP 239123. The functionalized fluoropolyethers with hydroxylic termination are obtained for instance according to the patents EP 148482, U.S. Pat. No. 3,810,874.

The polycarbonates of formula (I) are obtainable for instance by reacting a diol having perfluoropolyoxyalkylenic chain, for instance of general formula

wherein Rf and c have the above mentioned meaning, with
dialkyl-diarylcarbonates, preferably diphenylcarbonate, in the presence of basic catalysts, such as for instance potassium terbutylate, sodium methylate, sodium ethylate, or catalysts typically employed in transesterification reactions, such as for instance, zinc acetate or titanium tetraalkoxy, for instance titanium tetrabutoxy and by operating at high temprature as specified below.

The amount of catalysts generally ranges from 10 to 1000 ppm with respect to the fluorinated diol.

The catalyst is dissolved in the fluorinatd diol itself and the dialkyl-diarylcarbonate is added in inert atmosphere.

The polymerization reaction ocurs at temperatures higher than 120° C., preferably 180° C., firstly at atmospheric pressure and then under vacuum until removal of the by-product of dialkyl-diarylcarbonate (for instance phenol in the case diphenylcarbonate is used) which liberates from the polycondensation process.

The final temperature of the process can reach 200–220° C.

The polycondensation reaction is carried out under stirring and the whole process lasts some hours.

The product of the end reaction can be acidified for instance with acetic acid up to neutral pH.

The polycarbonate is then recovered without utilization of solvents, optionally by filtering the impurities, such as salts obtained with by-products of the process described above. Small amounts of not perhalogenated solvent, e.g. hexafluoroxylene, can be added, in the filtering step in order to reduce the viscosity of the product to be purified, if this is very high.

By defining with r$_0$ the stoichiometric ratio between diaryl- or dialkyl-carbonates moles and moles of fluorinated diol, polymerization degrees can be obtained comprised between 3 and >100 when r$_0$ ranges from 0.5 to 1.2, preferably from 0.5 to 1.

The fluorinated diols mentioned above of formula (II) are known products. They can be prepared for instance according to U.S. Pat. Nos. 3,766,251, 3,810,254, 4,085,137 and European patent application EP 148482.

As described above the polycondensation reaction between fluorinated diols and diaryl- or dialkyl-carbonates can be carried out directly in bulk without the utilization of solvents.

As diaryl carbonates, the aryl can be phenyl, as dialkyl, the alkyl ranges from C$_1$ to C$_{20}$ linear or branched. The carbonate monomer has to be liquid at the polymerization temperature.

It is moreover easy and reproducible the preparation of polycarbonate perfluoropolyethers with number average molecular weight of the oligomer (from 8,000 to 30,000) having high degree of hydroxylic bifunctionality.

The products according to the invention show Tg values comprised between −60° C. and −130° C. In particular the products according to the invention in which Rf has the structure 1), show Tg values comprised between −100° C. and −130° C. as the molecular weight of the diol of formula (II) changes.

In particular it has been surprisingly found that the Tg value of the products of the invention does not change very much with respect to the Tg value of the fluorinated diol utilized for the preparation thereof.

The products of the invention are fit for particular applications depending on their molecular weight and then on their functionality and viscosity.

The polycarbonate compounds of the invention can be crosslinked for instance with monomers or polyfunctional isocyanic prepolymers. For instance the prepolymer to be utilized as crosslinking agent is obtained starting from flurinated polyols, for instance tetraol, by reaction with diisocyanates such as IPDI (isophorone diisocyanate) or TDI (toluene diisocyanate). The preparation of the fluorinated polyols is for instance reported in the European patent application EP 95101145.1.

The products having an oligomeric character with number average molecular weight up to 30,000 can be used as diolic macromonomers or can be polyfunctionalized by the utilization of at least bifunctional monomers, preferably having different chemical functionalities so as to reduce a further growth of the polymer molecular weight.

As an example it can be cited isocyanate ethyl methacrylate (IEM), methylacryloisocyanate (MAI), isocyanurate of hexamethylendiisocyanate, isocyanate propyl triethoxysilane.

Such polycarbonate chain derivatives with perfluoropolyethereal structure and isocyanic, alkoxysilanic or methacrylic polyfunctionality can be crosslinked to give films characterized by extremely low Tg values, high contact angle, high oil-hydrophobicity and deformability.

The crosslinking of these derivatives is carried out according to techniques known in the art, for instance for the acrylic terminations the crosslinking is carried out radically in the presence of photoinitiators; in the case of polyisocyanic derivatives, crosslinking can occur with the atmospheric moisture (by obtaining ureic bonds); or by utilizing the polycarbonates of the invention by obtaining urethane bonds.

The products having a higher molecular weight are utilized in the field of the polymeric blends or as crosslinkable substrata in order to obtain rubbers with high mechanical, elastomeric characteristics at low temperature.

The following examples have the purpose to illustrate the present invention without limiting the scope thereof.

EXAMPLES

Characterization

In order to determine the molecular weight, the distribution of molecular weights, the hydroxylic bifunctionality degree and the hydroxylic equivalent weight of the oligomers and of the polymers having polycarbonate structure of formula (I), the following methodologies have been employed.

$^{19}$F-NMR Spectroscopy

From the analysis of the terminal groups carried out according to known modalities in the art on polyacetal systems (see Macromolecules 28, 7271 (1995)), adapted to the chemical shift values relating to the polycarbonate polymers of the present invention, the number average molecular weight Mn, the hydroxylic functionality f (i.e. the average number of reactive OH functions per molecule) and the equivalent weight PE as Mn/f were determined.

The technique is employable up to molecular weights in the range of about 25,000–30,000.

In FIG. 1 it is reported as an example a $^{19}$F-NMR spectrum relating to the polycarbonate prepared starting from the diol of formula (II) with Rf of formula 1).

Gel Permeation Chromatography (GPC)

Figure 2:
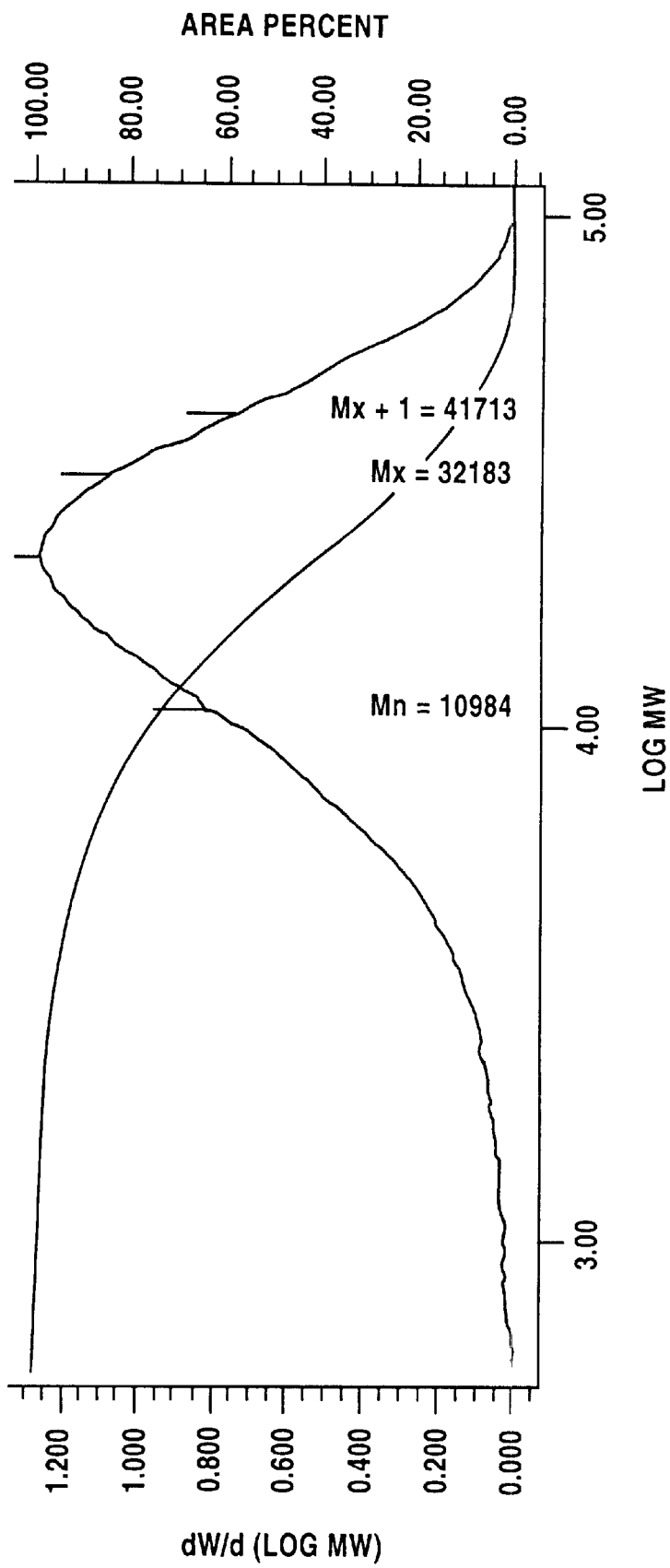

The molecular weight and Mw/Mn values, also for molecular weight higher than 30,000 were determined by GPC by utilizing a calibration built with narrow fractions of fluorinated diol (II), of known absolute molecular weight (see FIG. 2).

Titration of the End Groups

The hydroxylic equivalent weight, besides by NMR, was determined also by titration of the end groups. The method consists in dissolving the polycarbonate in suitable solvent partially fluorinated, such as for instance CFC 113, trifluorotoluene, hexafluoroxylene, adding an excess (about 1.5 times) of acetic anhydride in the presence of N-dimethylamino-pyridine as catalyst (1% by weight), reacting for 2 hours at room temperature, then hydrolizing the excess of anhydride with $H_2O$ and retrotitrating the carboxylic groups with aqueous NaOH having a known title.

Example 1

1500 g of fluorinated diol (II), having number average molecular weight Mn=3450, hydroxylic functionality 1.98 and equivalent weight 1745 are introduced in a glass reactor equipped with mechanical stirrer, thermometer, a neck for the solids charge, a neck with a U glass connector joined to a vacuum pump and, in this step, maintained under inert atmosphere. 300 mg of sodium methylate dissolved in 0.5 ml of anhydrous methanol are introduced and, under mechanical stirring, 73.6 g of diphenylcarbonate (DFC) are charged, for a stoichiometric ratio equal to r=0.79.

The reaction mixture is degassed under vacuum and reacted at T=180° C., under inert atmosphere, for 2 hours under mechanical stirring. Successively the vacuun pump is connected (30 mm Hg for one hour, then at 200° C. for 30 min at 1 mm Hg) removing the by-product phenol.

The produced polycarbonate is neutralized with acetic acid, charged with carbon (0.5% p/p), filtered on membrane and still brought under vacuum to remove the acetic acid in excess.

The final product (yield 95%) appears as a colourless oil, with viscosity=1650 mPa.s at 20° C. and Tg=−114° C. The NMR and GPC analysis show Mn values=15,000 with Mw/Mn=2. The titration of the terminal groups shows an hydroxylic equivalent weight=8,000, that is a functionality around 1.85.

Example 2

With procedure similar to the preceding example, 2070 g of fluorinated diol (II) having Mn=2030, hydroxylic functionality 1.95 and equivalent weight 1040, 185.7 g of DFC and 330 mg of potassium tert-butylate (r=0.85) are introduced.

With the same program of reaction times and temperatures of the preceding example, 1950 g of polycarbonate oil having viscosity=1630 mPa.s at 20° C., Tg=−108° C., Mw/Mn (GPC)=1.99, Mn (NMR)=12,000 and equivalent weight (titration)=6700, equal to a functionality of about 1.8, are recovered. The $^{19}$F-NMR spectrum and the GPC chromatogram are enclosed in FIGS. 1 and 2 respectively.

Example 3

With modalities similar to the preceding examples 2000 g of diol (II) (Mn=1960, functionality=1.98, equivalent weight 990) are reacted with 202.2 g of DFC and 180 mg of sodic methylate (r=0.925) are reacted.

1920 g of polycarbonate (II) having viscosity=6600 mPa.s at 30° C., molecular weight GPC=25000, Mw/Mn=2.2 and equivalent weight with titration=14,000–15,000, equal to an hydroxylic functionality around 1.6–1.7, are obtained.

Example 4

With operating modalities similar to the preceding examples, 1000 g of diol (II) having Mn=2300, equivalent weight=1153 and functionality 1.995 are reacted with 92.7 g of DFC and 100 mg of sodic methylate (r=0.995). In the polycondensation final phase (under vacuum) the temperature is increased up to 220° C. for 4 hours at 0.1 mm Hg.

900 g of polycarbonate (I) under the form of very viscous oil, having Mw (GPC)=120,000, Mw/Mn=2.3 and intrinsic viscosity [η], determined in CFC 113 at 30° C. according to the ASTM-=D2857 standard, equal to 0.3 dl/g, are obtained.

Example 5

100 g of polycarbonate (I) prepared according to example 2 are derivatized with 2.4 g of isocyanateethylmethacrylate (IEM, Dow Chemicals) at 50° C. in the presence of 8 mg of dibutyl tin dilaurate (DBTDL) as catalyst. The reaction is followed with an infrared spectrometer until the disappearance of the band attributable to the NCO function (2275 cm$^{-1}$). The reaction mixture becomes progressively limpid until complete homogeneity at the end of the reaction (after 4 hours).

The polycarbonate-methacrylate appears as a viscous and transparent liquid, with viscosity 2200 mPa.s at 20° C. and Tg=-107° C.

5 g of polycarbonate-methacrylate are mixed with 0.5 g of butylmethacrylate charged with 50 mg of DAROCUR® 1173 (photopolymerization initiator, Merck), bar casted on a glass support and irradiated with an UV lamp (light 365 nm, intensity 7000 microWatt/cm$^2$) from a distance of 15 cm. After 3 cycles of irradiation each of 15 seconds, by flowing nitrogen, a crosslinked and transparent film is obtained, resistant to more than 100 double rubs of cotton soaked in methyl ethyl ketone, with a static contact angle with H$_2$O>100° and Tg around -100° C.

Example 6

20 g of polycarbonate of Example 2 are treated with 2.33 g of DESMODUR® N 3300 (Bayer) in the presence of 10 ml of hexafluoroxylene and 10 mg of DBTDL at 40° C. After 3 hours, the solution is spread on a glass support and left a night at room temperature in the presence of atmospheric moisture. It is obtained a film of rubbery consistency, contact angle with H$_2$O>100° and resistant to swelling from various organic solvents such as ethyl alcohol, methyl ethylketone, tetrahydrofurane and hydrocarbons (toluene, heptane).

Example 7

20 g of polycarbonate of Example 2 are derivatized with 0.73 g of isocyanatepropyl-triethoxysilane (OSI Chemicals) in the presence of 5 mg of DBTDL at 50° C. in absence of solvent. After 4 hours it is noticed at the infrared the disappearance of the NCO band; the polycarbonate-triethoxysilanic product is charged with 1.6 g of glacial acetic acid and after one hour is put in stove at 80° C. in the presence of H$_2$O vapours.

After one night, a transparent film is obtained, resistant to more than 100 double rubs with MEK, contact angle with H$_2$O>100° and Tg=-100° C.

What is claimed is:

1. Perfluoropolyethereal compounds having polycarbonate structure, and general formula:

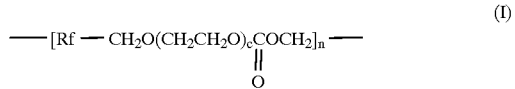

(I)

wherein
c is an integer of between 0 and 10, preferably between 0 and 3,
n is an integer from 2 to 1,000, extremes included,
Rf is a poly-fluorooxyalkylenic chain, having number average molecular weight (Mn) of between 500 and 10,000, having repeating units of at least one of the following structures, randomly distributed in the chain:

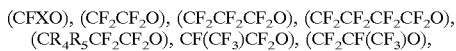

wherein
X=F, CF$_3$;
R$_4$ and R$_5$, equal to or different from each other, are selected from H, Cl, or perfluoroalkyl from 1 to 4 carbon atoms.

2. Perfluoropolyethereal compounds having polycarbonate structure according to claim 1, wherein Rf has number average molecular weight of between 1,000 and 4,000.

3. Perfluoropolyethereal compounds having polycarbonate structure according to claim 1, wherein Rf has the following structures:

1) —(CF$_2$O)$_{a'}$—(CF$_2$CF$_2$O)$_{b'}$—
   a'/b' of between 0.5 and 2, extremes included, a' and b' being integers so as to give the molecular weigh indicated above;

2) —(C$_3$F$_6$O)$_r$—(C$_2$F$_4$O)$_b$—(CFXO)$_t$—
   r/b=0.5–2.0; (r+b)/t is comprised between 10–30, b, r and t being integers so as to give the molecular weight indicated above, X has the meaning indicated above;

3) —(C$_3$F$_6$O)$_{r'}$—(CFXO)$_{t'}$—
   with r'/t'=10–30,
   r' and t' being integers so as to give the molecular weight indicated above; X has the meaning indicated above;

4) —(OCF$_2$CF(CF$_3$))$_z$—OCF$_2$(R'f)$_y$—CF$_2$O—(CF(CF$_3$)CF$_2$O)$_z$—
   wherein z is an integer such that the molecular weight is that indicated above;
   y is an integer of betwen 0 and 1 and R'f is a fluoroalkylenic group having 1–4 carbon atoms;

5) —(OCF$_2$CF$_2$CR$_4$R$_5$)$_q$—OCF$_2$(R'f)$_y$—CF$_2$O—(CR$_4$R$_5$CF$_2$CF$_2$O)$_s$—
   wherein
   q and s are integers such that the molecular weight is that indicated above;
   R$_4$, R$_5$, R'f, y have the meaning indicated above;

6) —(C$_3$F$_6$O)$_{r'''}$(CFXO)$_{t'''}$—OCF$_2$(R'f)$_y$—CF$_2$O(CF(CF$_3$)CF$_2$O)$_{r'''}$(CFXO)$_{t'''}$—
   where r'''/t'''=10–30,
   r''' and t''' being integers so as to give the molecular weight indicated above;
   R'f and y having the meaning indicated above.

4. Perfluoropolyethereal compounds having polycarbonate structure according to claim 1 wherein the chain terminals are essentially formed by hydroxylic groups.

5. Perfluoropolyethereal compounds having polycarbonate structure according to claim 1 wherein the number average molecular weight is comprised between 8,000 and 30,000.

6. Crosslinked products obtainable from perfluoropolyethereal compounds having polycarbonate structure according to claims 1–5.

7. Perfluoropolyethereal compounds having polycarbonate structure according to claim 1 wherein the end OH groups are reacted with bifunctional or polyfunctional monomers to obtain end groups different from OH.

8. Perfluoropolyethereal compounds having polycarbonate structure according to claim 7, having isocyanic, alkoxysilane, methacrylic functionality.

9. Crosslinked products obtainable from perfluoropolyethereal compounds with polycarbonate structure according to claim 8.

10. Perfluoropolyethereal compounds with polycarbonate structure according to claim 1 wherein the polydispersity Mw/Mn is lower than 3.

11. Perfluoropolyethereal compounds with polycarbonate structure according to claim 10 wherein the polydispersity Mw/Mn is in the range of 2.

12. Process for preparing perfluoropolyethereal compounds with polycarbonate structure according to claim 1, comprising the reaction of a diol having perfluoropolyoxyalkylenic chain with dialkyl-diarylcarbonates, in the presence of basic catalysts, such as potassium terbutylate, sodium methylate, sodium ethylate, or catalysts typically employed in transesterification reactions such as zinc acetate or titanium tetraalkoxy, and by operating at temperatures higher than 120° C.

13. Process for preparing perfluoropolyethereal compounds having polycarbonate structure according to claim 12 wherein it is operated at temperatures of 180° C.

14. Process for preparing perfluoropolyethereal compounds having polycarbonate structure according to claim 12, wherein the diol having perfluoropolyoxyalkylenic chain has general formula $$H(OCH_2CH_2)_cOCH_2RfCH_2O(CH_2CH_2O)_cH \qquad (II)$$

wherein Rf and c have the meaning indicated above.

15. Process for preparing perfluoropolyethereal compounds having polycarbonate structure according to claim 12, wherein the polymerization degree is comprised between 3 and >100 when $r_0$ ranges from 0.5 to 1.2, preferably from 0.5 to 1, $r_0$ being the stoichiometric ratio between diaryl- or dialkyl-carbonate moles and fluorinated diol moles.

16. Process for preparing perfluorpolyethereal compounds with polycarbonate structure according to claim 10, comprising the reaction of a diol having a perfluoroplyoxyalkylenic chain with dialkyl-diarylcarbontes, in the presence of basic catalysts, such as potassium terbutylate, sodium methylate, sodium ethylate, or catalysts typically employed in transesterfication reactions such as zinc acetate or titanium tetraalkoxy, and by operating at temperatures greater than 120° C.

* * * * *